UNITED STATES PATENT OFFICE.

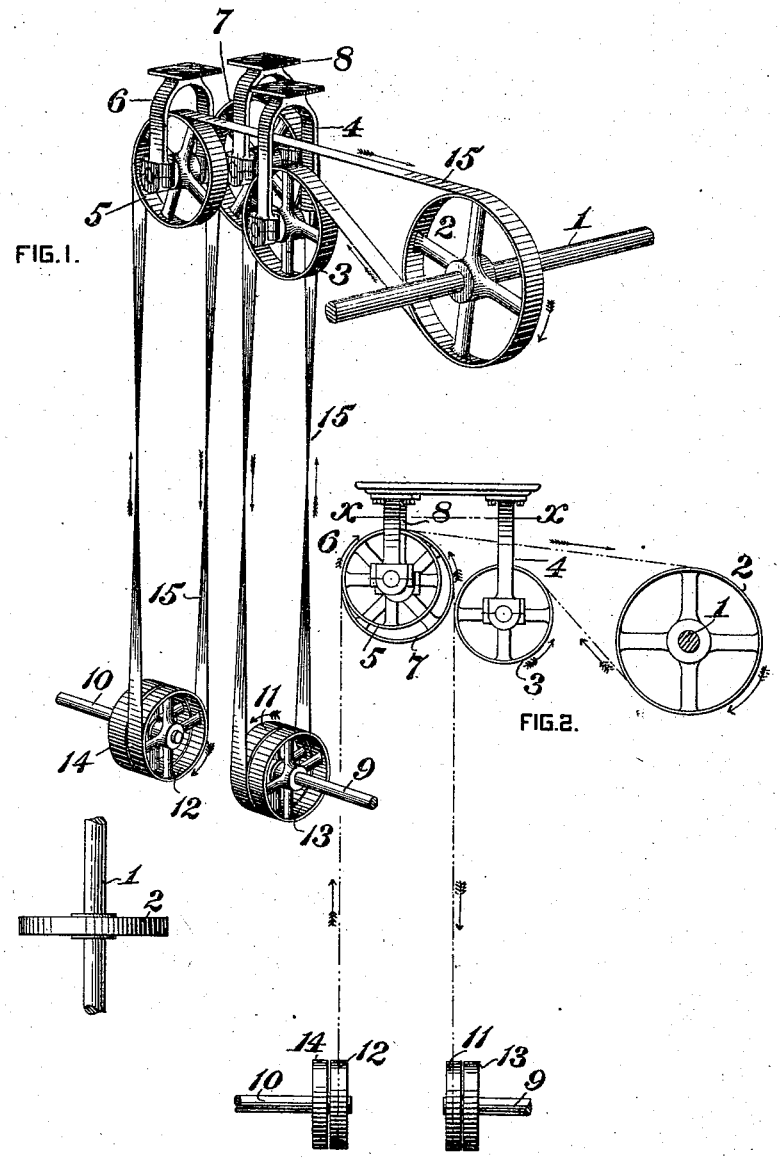

GEORGE H. GEYER, OF PITTSBURG, PENNSYLVANIA, ASSIGNOR TO JONES & LAUGHLINS, LIMITED, OF SAME PLACE.

POWER-TRANSMITTING MECHANISM.

SPECIFICATION forming part of Letters Patent No. 548,913, dated October 29, 1895.

Application filed July 22, 1895. Serial No. 556,701. (No model.)

*To all whom it may concern:*

Be it known that I, GEORGE H. GEYER, a citizen of the United States, residing at Pittsburg, in the county of Allegheny and State of Pennsylvania, have invented or discovered a certain new and useful Improvement in Power-Transmitting Mechanism, of which improvement the following is a specification.

My improvement relates to apparatus for the transmission of power through the medium of belts and pulleys from a main driving or counter shaft to mechanism to be operated located at a distance therefrom; and the object of my invention is to provide an apparatus for the transmission of power from a main driving or counter shaft to two shafts located at a distance therefrom and in line with each other but rotating at right angles to the main driving or counter shaft and intended to be rotated in opposite directions.

The improvement claimed is hereinafter fully set forth.

In the accompanying drawings, Figure 1 is a view in perspective of a power-transmitting mechanism embodying my invention; Fig. 2, a side view, in elevation, of the same; and Fig. 3 a horizontal section taken on the line $x\,x$ of Fig. 2.

In the practice of my invention I provide a horizontal main driving or counter shaft 1, located in any convenient position and supported in any suitable manner and having secured upon it a main driving-pulley 2 of proper diameter. A guide sheave or pulley 3, of somewhat smaller diameter than the driving-pulley 2 and which for the direction of rotation of the driving-pulley indicated in the drawings may be termed the "initial" guide-pulley, is journaled in bearings at the lower ends of a vertical hanger 4 and is located in line with and at a suitable distance from the driving-pulley 2. The bearings of the initial guide-pulley 3 are so located that a line drawn tangentially to said pulley will be parallel with and close to the central transverse plane of one of the driven pulleys 11 to be presently described. A guide sheave or pulley 5, of corresponding diameter to the pulley 3, and which may be termed the "final" guide-pulley, is journaled in bearings at the lower ends of a vertical hanger 6 and is located in line with and a short distance from and above said pulley 3. The bearings of the final guide-pulley 5 are so located that a line drawn tangentially to said pulley will be parallel with and close to the central transverse plane of one of the driven pulleys 12 to be presently described. A guide sheave or pulley 7, of a diameter slightly greater than the pulleys 3 and 5 and substantially equal to the distance between the transverse central planes of the fast pulleys upon the shafts of the machines to be operated, and which may be termed the "intermediate" guide-pulley, is journaled in bearings at the lower ends of a vertical hanger 8 and is located to one side of the pulley 5 and preferably at such a height as to bring its top about on a level with the top of said pulley 5. The axial plane of the intermediate guide-pulley is located centrally between the transverse central planes of the driven pulleys 11 and 12.

The driven shafts 9 and 10 of the machines to be operated extend at an angle to the axes of the pulleys 2 3 5 7 and main driving or counter shaft 1 and are mounted in bearings centrally between and at any desired distance below the pulleys 5 and 7 and in line with each other. Fast pulleys 11 and 12, the diameter of which is about equal to the distance between the centers of the pulleys 5 and 7, are secured upon the inner or adjacent ends of the shafts 9 and 10, respectively, and are located below the outer edges of the pulley 7 and at or about at right angles thereto. The shafts 9 and 10 are further provided with loose pulleys 13 and 14, mounted thereon adjacent to the fast pulleys 11 and 12, respectively, for the purpose of shifting the belt when it is desired to stop the rotation of one or both of the shafts 9 and 10 without interfering with the rotation of shaft 1.

Power is transmitted from the main driving or counter shaft 1 to the shafts 9 and 10 for the rotation thereof in opposite directions to each other through the medium of a belt 15, passing around the pulley 2, over the initial guide-pulley 3, down to and around the pulley 11, up to and around the intermediate guide-pulley 7, down to and around the pulley 12, up to and over the final guide-pulley 5, and thence back to the driving-pulley 2.

The direction of lead of the belt is thus reversed in its passage around each of the several pulleys. By the construction and combination of a belt and a series of pulleys, as shown and described, it will be seen that two shafts in line with each other and located at a distance from a main driving or counter shaft may be rotated in opposite directions to each other by power applied from a single shaft rotating at an angle to the driven shafts without crossing of belts or any other objectionable complications.

I claim as my invention and desire to secure by Letters Patent—

In a power transmitting mechanism, the combination, substantially as set forth, of a main driving or countershaft, two driven shafts journaled to rotate at a distance therefrom and at an angle thereto, a pulley fixed on the driving shaft, pulleys fixed on the driven shafts, an initial guide pulley and a final guide pulley rotating in a plane parallel to that of the driving pulley, and in such relation to the transverse central planes of the pulleys of the driven shafts that lines passing through or near said planes shall be tangential to said pulleys respectively, an intermediate guide pulley rotating in a plane parallel to that of the driving pulley and having its axial plane located centrally between the transverse central planes of the driven pulleys, and a belt passing over the driving pulley, guide pulleys, and pulleys of the driven shafts.

In testimony whereof I have hereunto set my hand.

GEORGE H. GEYER.

Witnesses:
J. SNOWDEN BELL,
F. B. GAITHER.